United States Patent [19]

Berkley et al.

[11] 4,166,924

[45] Sep. 4, 1979

[54] REMOVING REVERBERATIVE ECHO COMPONENTS IN SPEECH SIGNALS

[75] Inventors: David A. Berkley, New York, N.Y.; Olga M. M. Mitchell, Summit, N.J.

[73] Assignee: Bell Telephone Laboratories, Incorporated, Murray Hill, N.J.

[21] Appl. No.: 880,186

[22] Filed: Feb. 22, 1978

Related U.S. Application Data

[63] Continuation-in-part of Ser. No. 796,074, May 12, 1977, abandoned.

[51] Int. Cl.² .............................................. H04B 15/00
[52] U.S. Cl. ................................... 179/1 P; 307/237; 328/165
[58] Field of Search ................... 179/1 FS, 1 J, 1 HF, 179/1 P, 170.2, 170.6, 170.8, 1 AT; 307/237; 328/145, 168, 165; 325/482

[56] References Cited

U.S. PATENT DOCUMENTS

| | | | |
|---|---|---|---|
| Re. 28,919 | 7/1976 | Berkley et al. | 179/170.8 |
| 3,028,562 | 4/1962 | Rosen | 328/168 |
| 3,566,285 | 2/1971 | Schroeder | 307/237 |
| 3,585,311 | 6/1971 | Berkley et al. | 179/170.2 |
| 3,660,681 | 5/1972 | Vlaeminck | 307/237 |
| 3,701,028 | 10/1972 | Markevich | 307/237 |
| 3,716,726 | 2/1973 | Trimble | 307/237 |
| 3,784,747 | 1/1974 | Berkley et al. | 179/170.2 |
| 3,916,293 | 10/1975 | Omori et al. | 328/172 |
| 4,031,338 | 6/1977 | Campanella et al. | 179/170.2 |

OTHER PUBLICATIONS

O. Mitchell, G. Yates, T. Bateman; "Reduction of Long-Time Reverberation by Center Clipping," Journal of the Acoustical Society of America; Fall 1975; p. S130.
D. Berkley, M. Mitchell; "Seeking the Ideal in Hands-Free Telephony;" Bell Labs Record; Nov. 1974; pp. 318-325.

*Primary Examiner*—Kathleen H. Claffy
*Assistant Examiner*—Randall P. Myers
*Attorney, Agent, or Firm*—H. L. Logan

[57] ABSTRACT

A system is disclosed for automatically reducing reverberation in typical voice telecommunications systems. This system uses center clipping levels adaptive to the level of reverberation input speech. In one configuration, the voiceband is divided into two sub-bands and center clipping occurs only for the lower band; costs are reduced with surprisingly little transmission quality sacrifice. Clipping-level holdover circuitry with exponential decay appears to work well for a large variety of reverberant enclosures.

9 Claims, 8 Drawing Figures

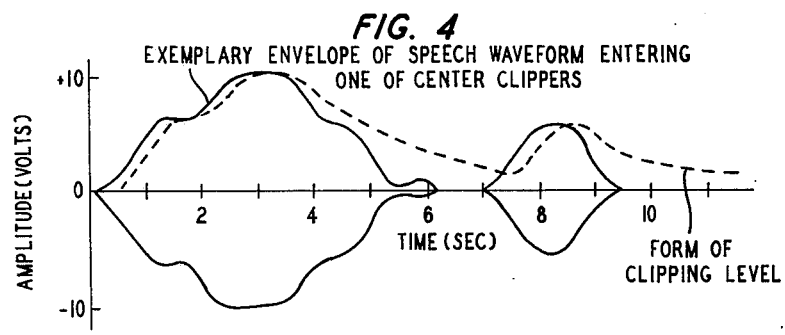
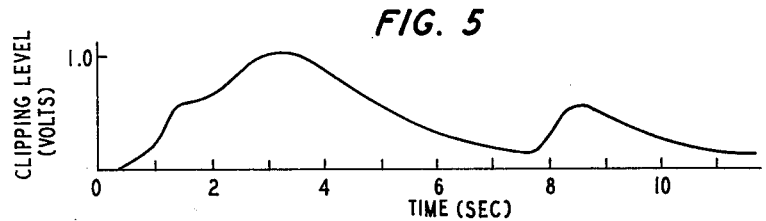
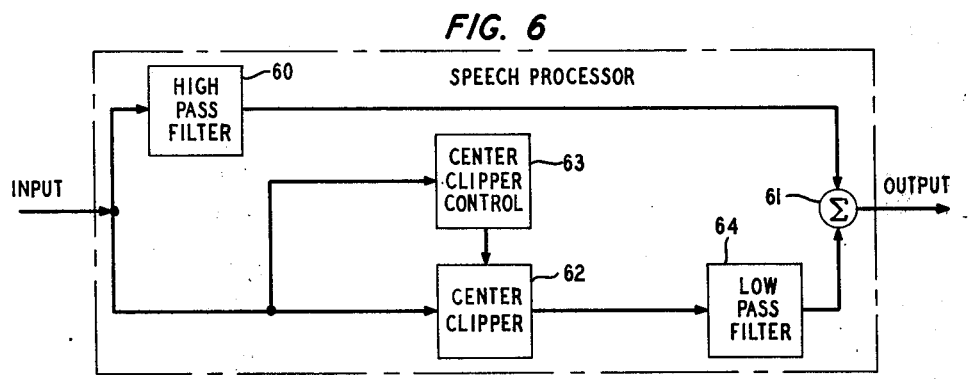
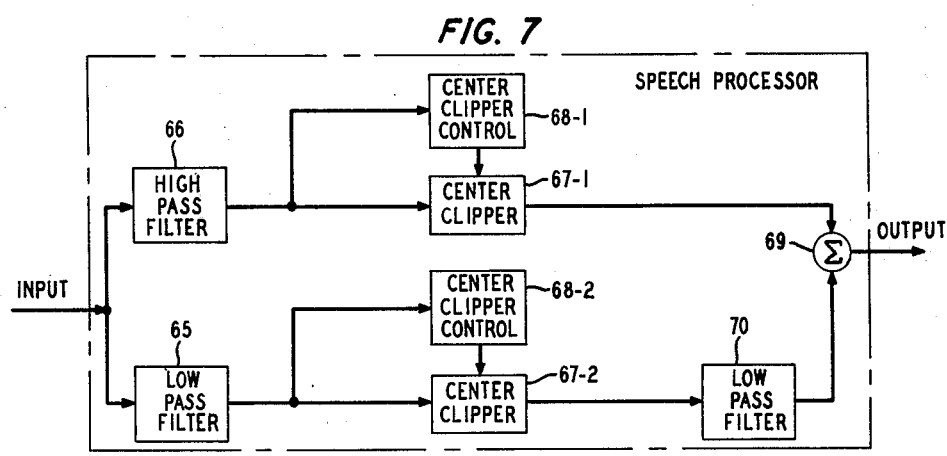

REMOVING REVERBERATIVE ECHO COMPONENTS IN SPEECH SIGNALS

CROSS-REFERENCE TO RELATED APPLICATION

This application is a continuation-in-part of our co-pending application, Ser. No. 796,074, filed May 12, 1977, now abandoned.

FIELD OF THE INVENTION

This invention relates to speech signal processing and more particularly to reducing reverberant tail components in speech signals received by a microphone or telephone transmitter in a reverberative enclosure such as an office.

BACKGROUND OF THE INVENTION

The factors giving rise to room echoes (reverberation) and network echoes in telephony and similar voice communications, as well as their effect on speech intelligibility, are well explored in the literature (see, for example, U.S Pat. No. 3,585,311 and Re. 28,919 and, also, the article entitled "Seeking The Ideal In Hands-Free Telephony," *Bell Laboratories Record,* Volume 52, No. 10, November 1974, page 318 et seq., authored by the present applicants).

In brief, room echoes occur because of room acoustics which result in replicas of speech signals delayed from a few milliseconds to several seconds. Some of these echo signals add to the original speech signals while some of the relatively long ones occur following the termination of the original signals. Because the echoes following the termination of the original signals are not masked by the original signals, they are particularly objectionable. Such unmasked room echoes have been termed "reverberant tails".

Network echoes, on the other hand, occur because of the network and are delayed replicas of the talker's speech as heard by the talker. Such echoes occur because slight imperfections in a network cause some of the talker's speech to be fed back to the talker. These echoes are not added to the original speech other than the fact that they are heard by the talker when speaking.

Previously mentioned U.S. Pat. No. 3,585,311 discloses a speech processing system which uses fixed-level center clipping of a speech signal to reduce network echoes and reverberant tail portions of room echoes. Although this system works satisfactorily in controlled environments and systems, it has been found to be not only inadequate but sometimes troublesome when used in the average telephone application. In particular, it has been found that fixed-level center clipping cannot accommodate: a wide range of network echo conditions produced by variations between networks; a wide range of room echo conditions produced by uncontrolled room conditions; and wide ranges in both network and room echoes produced by uncontrolled talkers.

The invention in the aforementioned U.S. Pat. No. Re. 28,919 provides improved network echo control in the presence of both talker level variability and network variability. In accordance with that invention, a plurality of control signals are derived from voice signals arriving at either end of the network. These control signals are then utilized to adjust the clipping levels in a center clipper located in the outgoing path at that end of the network. In particular, these clipping levels are adjusted so that all of the incoming voice signals which appear on the outgoing path are in effect blocked, whereby network echoes are not heard by the talker at the other end of the network.

Although this configuration provides self-regulation with respect to network echoes, it does not have the ability to reduce, in a self-regulating manner, reverberant tails produced at either end of the network. At best—and as explained in that patent—a limited amount of reverberant tail control can be achieved by providing a finite minimum amount of clipping in the center clipper. Greater control, however, is often desired.

SUMMARY OF THE INVENTION

An object of the present invention is to suppress automatically reverberant tails in conversations produced by people speaking with differing degrees of loudness. Another object is to make the suppression adjustable so as to accommodate to some degree the characteristics of the room in which the conversations are produced.

In accordance with the present invention, at least a portion of electrical signals on a frequency band basis is coupled into at least one channel comprising a center clipper and a center clipper level control circuit. In each channel where there is a center clipper and control circuit, the clipper is connected in series in the channel while the input and output ports of the control circuit are connected to the input and control ports of the clipper, respectively. Finally, at least portions of the outputs on a frequency band basis of all of the channels, when more than one is present, are combined to produce a final output.

In further accordance with the invention, the center clipper level control circuits may be provided with decay controls so that any output produced by a control circuit may be adjusted to decrease at a controlled rate once the input to the control circuit ceases.

As in the network echo suppression of the previously discussed U.S. Pat. No. Re. 28,919, the present invention contemplates the use of center clippers and, furthermore, center clipper level control circuits for adjusting the clipping levels within the center clippers. However, whereas the input ports of the control circuits in the earlier structure are connected to the incoming path of a telephone station, the control circuit input ports in accordance with the present invention are connected to the input ports of their respective center clippers. The earlier structure therefore controls the clipping levels in response to the signals coming from the far end of the network, which functions to suppress all of the network echoes. On the other hand, the clipping levels in the present invention are controlled in response to the levels of the inputs to their center clippers; i.e., in response to the level of the speech input at the end of the network where the clippers and control circuits are located. Embodiments of the present invention therefore function to suppress reverberant tail portions of room echoes as distinguished from network echoes.

BRIEF DESCRIPTION OF THE DRAWING

FIG. 4 is a time graph of a speech waveform input;

FIG. 5 is a time graph of the control signal developed from the waveform of FIG. 4;

FIG. 6 is a block diagram of an embodiment of the invention using two channels with center clipping in only one channel;

FIG. 7 is a block diagram of an embodiment of the invention using two channels with low pass and high pass filters connected to the input ends of the channels.

DETAILED DESCRIPTION OF ILLUSTRATIVE EMBODIMENTS

Figure 1:
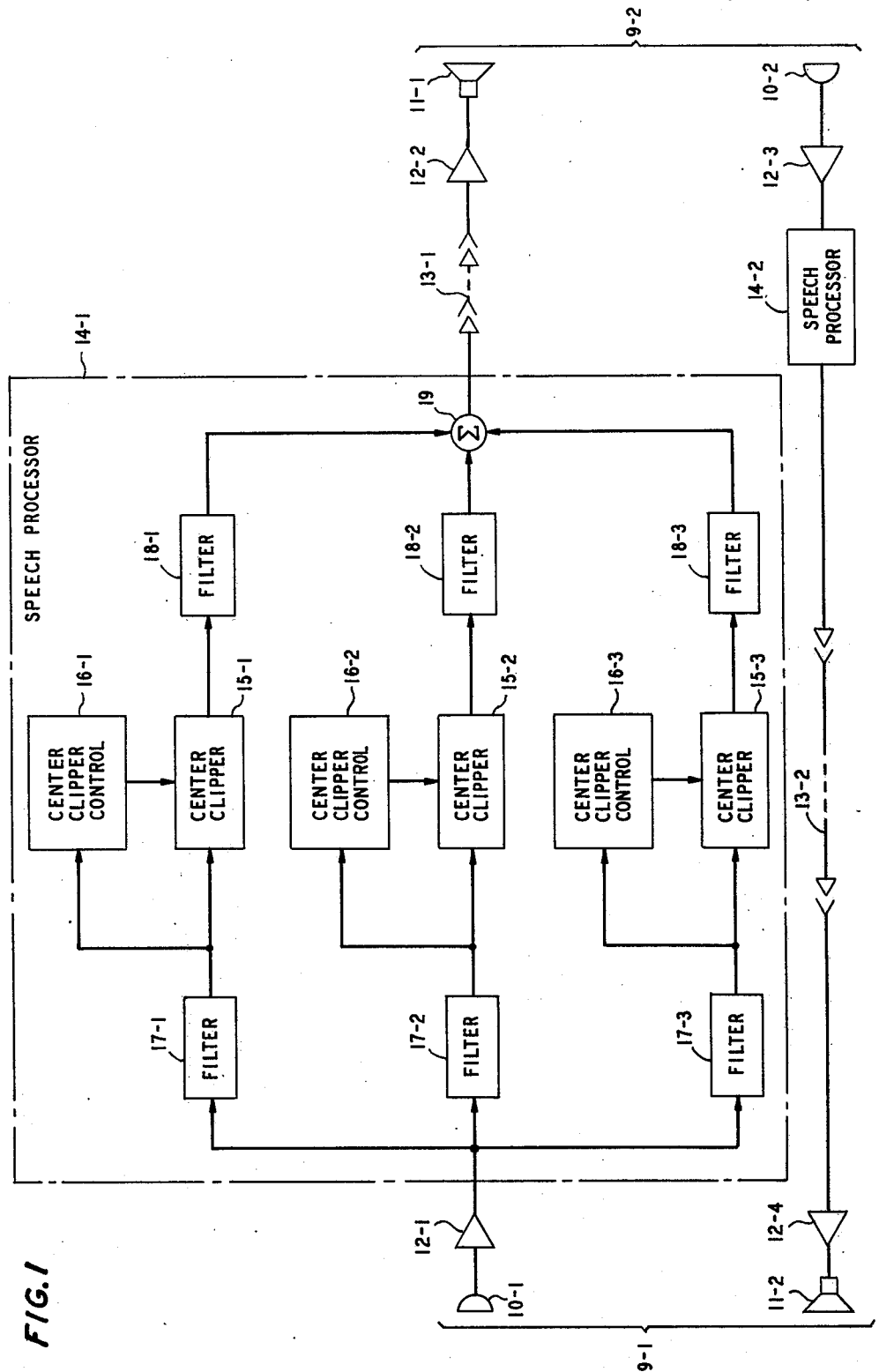
FIG. 1 is a block diagram of a communications system utilizing one embodiment of the invention.

FIG. 1 shows an embodiment of the invention in a four-wire or full duplex connection for hands-free or teleconferencing connection betweem, for example, two conference stations denoted 9-1 and 9-2. These stations comprise microphones 10-1, 10-2 and loudspeakers 11-1, 11-2. The transmit-receive path from station 9-1 to station 9-2 consists of microphone 10-1, an amplifier 12-1, a speech processor 14-1, a network path 13-1, an amplifier 12-2 and loudspeaker 11-1. The transmit-receive path in the opposite direction between stations 9-2 and 9-1 consists of microphone 10-2, an amplifier 12-3, a speech processor 14-2 (identical to processor 14-1), a network path 13-2, an amplifier 12-4 and loudspeaker 11-2. Not shown because of its conventional nature is circuitry occasionally necessary for preventing acoustic feedback. Amplifiers 12-1 to 12-4 are helpful to ensure sufficient signal level amplitudes at the input ports to processors 15-1, 15-2 and 15-3, and loudspeakers 11-1 and 11-2.

Speech processor 14-1 of FIG. 1 has three channels. The first channel comprises a center clipper 15-1 and a center clipper control circuit 16-1, the second channel comprises a center clipper 15-2 and a center clipper control circuit 16-2 while the third channel comprises a center clipper 15-3 and a center clipper control circuit 16-3. In each channel, the center clipper input and output ports are connected to place the clipper in series in its channel. Furthermore, the control circuit in each channel has its input and output ports connected to the input and control ports, respectively, of the channel center clipper.

Speech processor 14-1 also has an input circuit comprising three contiguous bandpass filters 17-1, 17-2 and 17-3 having their input ports all joined together to receive input signals to processor 14-1 while their output ports are connected to the processor channels, respectively. These filters separate the processor input signals into three contiguous frequency bands for processing in the three channels.

Processor 14-1 further comprises an output circuit comprising three bandpass filters 18-1, 18-2 and 18-3 and a summer 19. The input ports of filters 18-1, 18-2 and 18-3 are connected to the output ports of center clippers 15-1, 15-2 and 15-3, respectively, while their output ports are connected to summer 19. These filters preferably have contiguous pass bands like those of filters 17-1, 17-2 and 17-3, respectively, but they may comprise low pass filters. Their function is to attenuate harmonic and/or intermodulation products produced by the center clipping process.

The invention in its simplest form comprises a single channel in the speech processor 14-1 of FIG. 1 without input and output filters and, furthermore, without summer 19.

Figure 2:
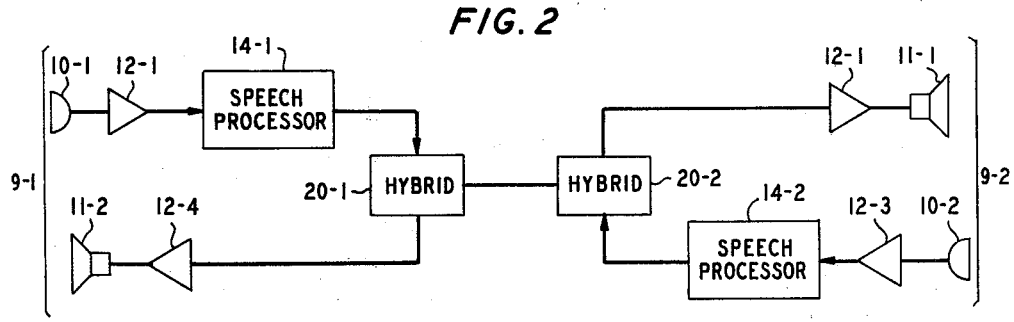
FIG. 2 is a block diagram of another communication system utilizing an embodiment of the invention.

The four-wire system shown in FIG. 1 is one typically encountered in telecommunications links. However, a two-wire system such as shown in FIG. 2 is also advantageously served by the invention. Essentially the only difference is in the use of hybrids 20-1 and 20-2, with the speech processors 14-1 and 14-2 connected as already described with respect to FIG. 1.

Figure 3:
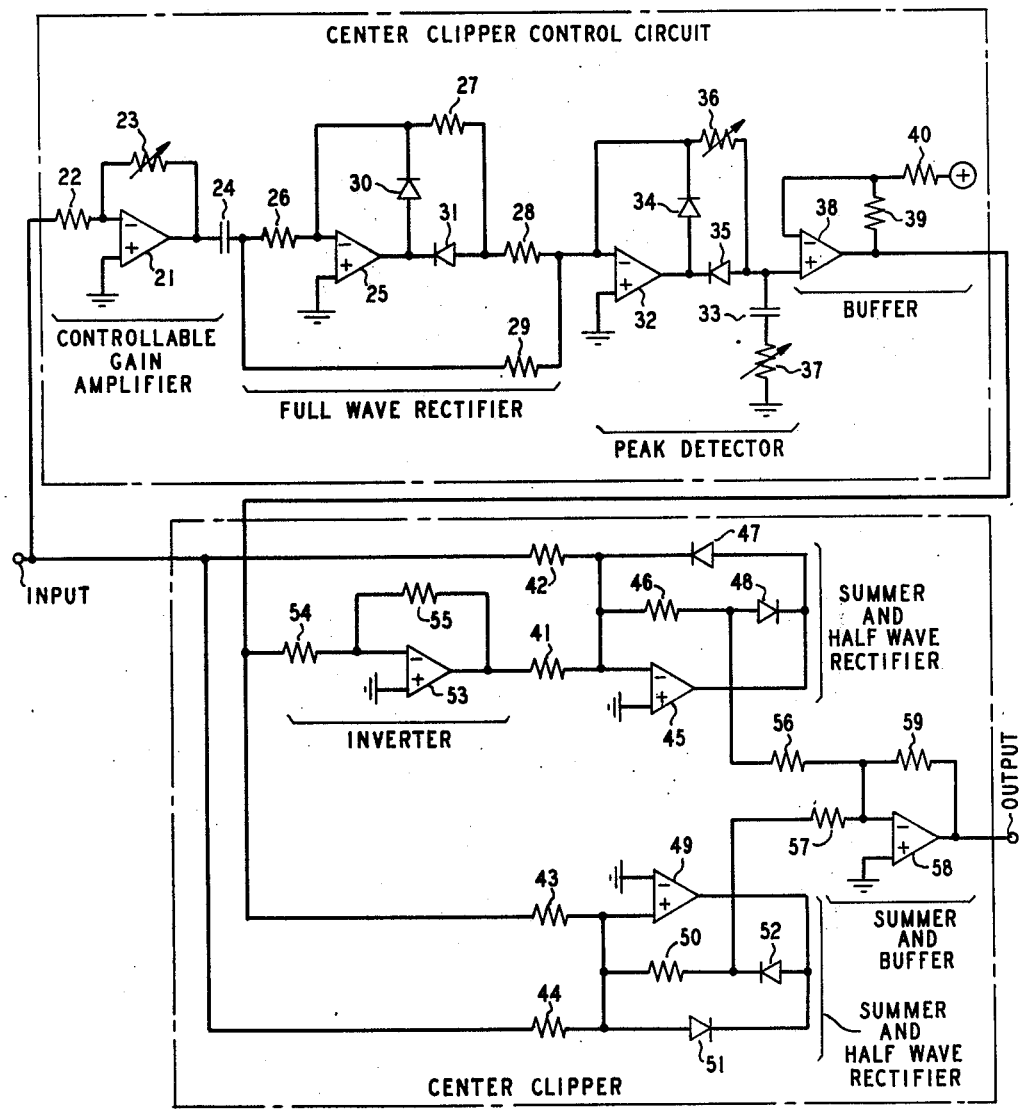
FIG. 3 is a circuit diagram of a center clipper control circuit and a center clipper which may be used when practicing the invention.

While workers in the art will readily recognize that center clippers 15-1, 15-2, and 15-3 and control circuits 16-1, 16-2 and 16-3 can be constructed in numerous fashions, a particular control circuit and a particular clipper found to be advantageous in cost and simplicity are included herein as FIG. 3.

The input port to the control circuit in FIG. 3 is connected to a controllable gain amplifier comprising an operational amplifier 21, a resistor 22 and a feedback potentiometer 23 which is used to set the amplifier gain. The output of this amplifier is fed via a capacitor 24 to a conventional full wave rectifier comprising operational amplifier 25, resistors 26, 27, 28 and 29 and diodes 30 and 31. The output of the rectifier is then peak detected in a peak detector comprising operational amplifier 32, capacitor 33, diodes 34 and 35 and potentiometers 36 and 37. Finally, a buffer amplifier comprising operational amplifier 38 and resistors 39 and 40 applies the positive output of the peak detector to the output port of the control circuit.

With respect to the center clipper of FIG. 3, its input port is connected to two summers and half-wave rectifiers. Resistors 41 and 42 comprise one summer while resistors 43 and 44 comprise the other summer. The rectifier comprising operational amplifier 45, resistor 46 and diodes 47 and 48 produces a negative output while the rectifier comprising operational amplifier 49, resistor 50 and diodes 51 and 52 produces a positive output. The control port of the clipper receives the output of the control circuit and applies it to both summer resistor 43 and an inverter comprising operational amplifier 53 and resistors 54 and 55. The inverter inverts the control circuit output and applies it to summer resistor 41. The non-inverted and inverted control outputs produce off-setting effects which must be overcome by the input to the clipper before rectification occurs; this is the center clipping effect. The rectifier outputs are summed in a summer comprising resistors 56 and 57 and are applied, in an inverted sense, to the clipper output port by way of a buffer amplifier comprising operational amplifier 58 and resistor 59.

Referring back to the peak detector in the center clipper control circuit of FIG. 3, the charging path for capacitor 33 is via diode 35 and potentiometer 37 while its discharging path is via potentiometers 37 and 36 and diode 34. In operation, potentiometer 37 is adjusted to control the charging rate of capacitor 33 while potentiometer 36 is adjusted to control the discharging rate. By this arrangement it is possible to control the rate at which the control circuit output decreases when an input thereto ceases. This permits the control circuit output to be controlled so as to decay at a rate to somewhat match reverberant tail decay for a given enclosure. (Varying potentiometer 36 of course also changes the gain of the peak detector; however, the overall gain of the control circuit is controllable by adusting potentiometer 23 of the controllable gain amplifier.)

Typically, reverberant energy arrives at microphone 10-1 of FIG. 1 about 25–50 milliseconds after the arrival at the same point of the direct path speech energy. This reverberant energy exists with decreasing amplitude for a period depending on the reverberation time of the room. In general, this energy decreases in an exponential manner.

The solid lines of FIG. 4 are an exemplary graphical portrayal of the envelope of a waveform entering a clipper and a control circuit. The dotted lines represent the form of the control circuit output.

FIG. 5 is an exemplary graphical portrayal of the control circuit output, a voltage that is 1/10 (20 dB below) the amplitude of the positive value of the speech envelope signal. The actual control circuit output level in a particular room environment can be adjusted for optimization when using the center clipper control circuit of FIG. 3 by adjusting potentiometer 23.

FIGS. 4 and 5 also show the fall rate of the control circuit output occurring after the dying down of the speech signal envelope. In general, the fall rate has an exponential time constant related to the reverberation time of the enclosure itself. For a small office, this exponential time constant typically is 250 milliseconds. Furthermore these figures show a finite rise time which in effect delays the control circuit output so that center clipping does not begin until the arrival of the reverberant energy.

FIG. 4 further illustrates a feature of the invention in which the clipping level actually bridges a silent interval between two speech envelopes, thus to provide a controlled amount of removal of room noise—a further undesired form of energy predominating in the inter-speech silence period but otherwise drowned out by the speech itself.

It has been observed in the literature that low frequency reverberation effects are the most pronounced in a listener's perception. Proceeding from these observations, the embodiment of the invention shown in FIG. 6 was conceived. In this embodiment the input signal is split into two channels. A high pass filter 60 having a frequency cutoff at, for example, 900 Hz feeds a portion of the signal into one channel. This channel does not perform any processing but merely applies the signal therein to a summer 61. The entire frequency content of the input signal is fed into the second channel. This channel includes a series connected center clipper 62 and a center clipper level control circuit 63. (These units may comprise the circuits disclosed in FIG. 3.) Control circuit 63 has its input and output ports connected to the input and control ports, respectively, of clipper 62 as shown and discussed in previously described embodiments. The output of clipper 62 is fed via a low pass filter 64 to summer 61. Filter 64 functions to attentuate harmonic and/or intermodulation products as discussed herein with respect to other embodiments. If desired, further attenuation of these products can be achieved by using a second low pass filter to feed the channel with clipper 62.

In the system of FIG. 6 a decay time of 150 msec for 6 dB decrease in clipping level was used in an experiment involving auditorium speech. In rooms approximately 12×24 feet in floor dimension or smaller, holdover of approximately 70 msec was found sufficient.

The band edge of low pass filter 64 advantageously is set at three times the lowest frequency expected in the speech signal input. For the telephone band this is typically a value of approximately 900 Hz.

The reduction of long time reverberation in the system just described is surprisingly comparable in quality to the case of a multiband center clipping system in which all bands are clipped. The processing achieved by the elements of FIG. 6 differs, however, in its effect on background noise. Center clipping in all frequency bands removes all background noise between words in the spoken text. Center clipping in only the lower bands allows noise, for example, above 900 Hz, to appear at the output. In spite of this limitation the simplified center clipping process is demonstrably effective in improving the intelligibility of a reverberant speech signal.

Still another embodiment of the invention is shown in FIG. 7. This embodiment uses a low pass filter 65 and a high pass filter 66, each having cutoffs at about 1000 Hz, to couple portions of an input signal into each of two channels. Each channel includes a clipper 67-1, 67-2 and a clipper control circuit 68-1, 68-2 connected as in the channels of previously described embodiments. The output of the channel fed by high pass filter 66 is fed to a summer 69 while the output of the channel fed by low pass filter 65 is fed through a low pass filter 70 to summer 69.

Figure 8:
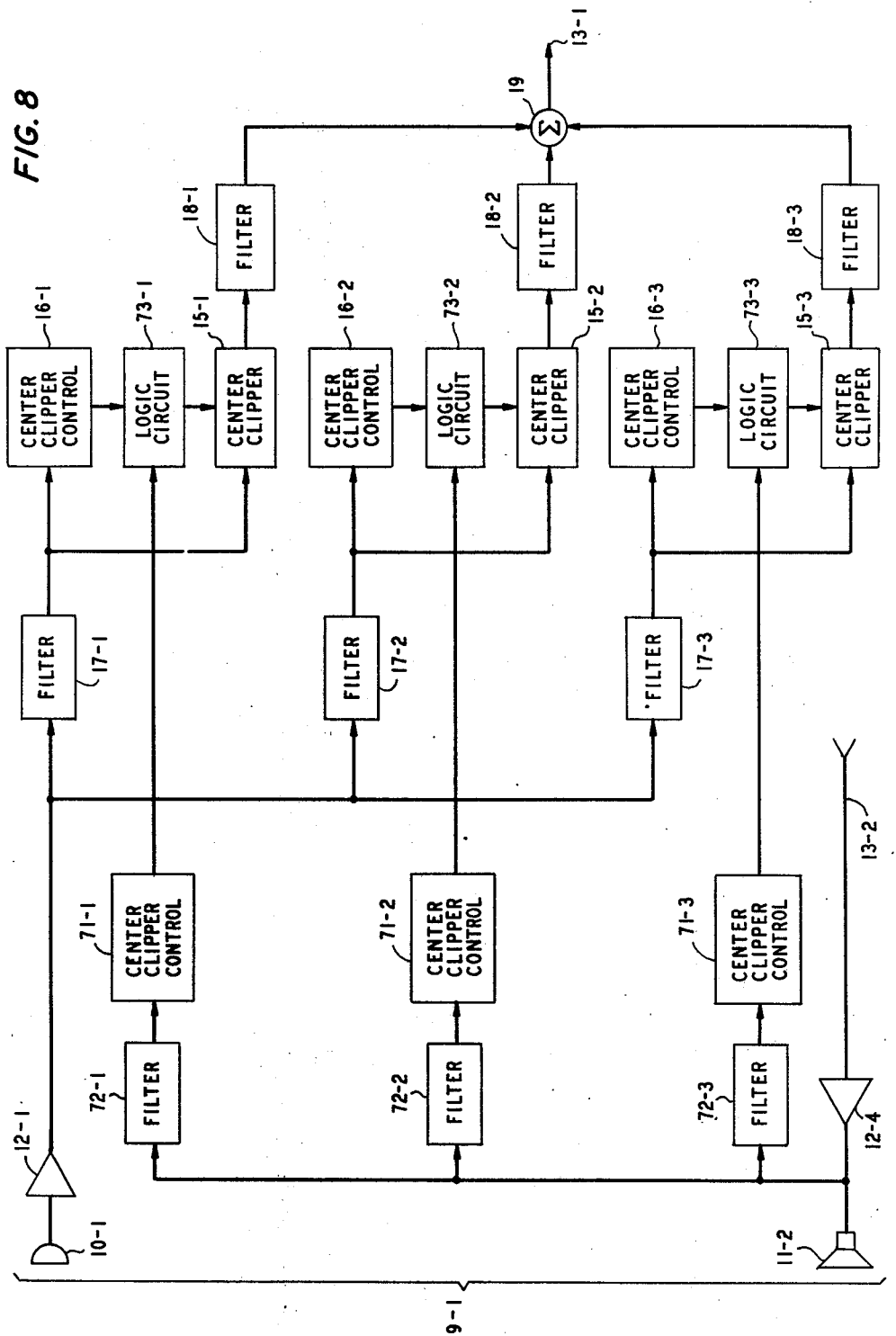
FIG. 8 is a further variation of the system depicted in FIG. 1.

FIG. 8 shows the embodiment of FIG. 1 of the present invention combined with the teachings of the aforementioned U.S. Pat. No. Re. 28,919. Center clipper control circuits 71-1, 71-2 and 71-3 and filters 72-1, 72-2 and 72-3 perform the identical functions of control unit 18 of FIG. 7 of Re. 28,919 to which the reader is referred, and which is hereby incorporated in this application. Circuits 71-1, 71-2 and 71-3 derive their inputs from the incoming path to station 9-1 via filters 72-1, 72-2 and 72-3. The network echo control outputs from circuits 71-1, 71-2 and 71-3 are fed to logic circuits 73-1, 73-2 and 73-3, respectively. The reverberant tail control outputs from circuits 16-1, 16-2 and 16-3 are also fed to logic circuits 73-1, 73-2 and 73-3, respectively. In the logic circuits, the network echo control levels from control circuits 71-1, 71-2 and 71-3 are compared with the reverberant tail control levels from control circuits 16-1, 16-2, and 16-3. Logic circuits 73-1, 73-2 and 73-3 which advantageously are conventional comparators, determine in each instance which of the received levels is higher, and provide as an output the higher value. This arrangement has the advantage of removing the dominant degradation (i.e., network echoes or reverberant tails).

We claim:

1. In a speech processing apparatus for suppressing reverberant tails, said apparatus comprising at least one channel having a center clipper having input, output and control ports with said input and output ports connected in said channel to place said center clipper in series connection therewith and, furthermore, having a center clipper level control circuit having input and output ports with said output port connected to said center clipper control port, AN IMPROVEMENT CHARACTERIZED IN THAT said input port of said center clipper level control circuit is connected to said input port of said center clipper to cause said center clipper and said center clipper level control circuit to receive the same input signals;

said control circuit and said clipper cooperating to cause the clipping level of said clipper to increase as the envelope of said input signal increases; and said control circuit including an operational amplifier circuit with charging and discharging paths so that said control circuit has an output characteristic whereby any output produced thereby decreases at a determined rate over a period of time when the input to said control circuit is terminated to cause clipping to suppress said reverberant tails in the output of said clipper.

2. Apparatus for processing electrical signals for suppressing reverberant tails, said apparatus comprising
at least two electrical channels,
at least one of said channels comprising a center clipper having input, output and control ports with said input and output ports connecting said clipper in series in said one channel and further comprising a center clipper level control circuit associated with said center clipper, said control circuit having input and output ports connected to said center clipper input and control ports, respectively, to cause the clipping level of said clipper to increase as the envelope of input signals to said input ports of said control circuit and said clipper increases, and furthermore, having an output characteristic whereby any output produced thereby decreases at a determined rate over a period of time when the input to said control circuit is terminated to cause clipping to suppress said reverberant tails in the output of said clipper.
first means for coupling said electrical signals within predetermined frequency passbands into said channels, respectively,
second means for passing substantially only those outputs of said channels within predetermined frequency passbands, and
third means for combining the outputs of said second means.

3. Apparatus in accordance with claim 2 in which
said first means comprises at least one electrical filter connected to the input end of one of said channels and
said second means comprises at least one electrical filter connected to the output end of another of said channels.

4. Apparatus in accordance with claim 3 in which
said first means comprises a plurality of contiguous passband electrical filters equal in number to said channels, the input ports of said filters being connected to a common input port and the output ports of said filters being connected to the input ends of said channels, respectively.

5. Apparatus in accordance with claim 4 in which
said second means comprises a plurality of contiguous passband filters substantially identical to those comprising said first means, the input ports of said second means filters being connected to the output ends of said channels, respectively, whereby the filters at the opposite ends of each channel are substantially identical to one another.

6. Apparatus in accordance with any one of claims 1 through 5 in which said output produced by said control circuit decreases at a substantially exponential rate upon the termination of an input thereto.

7. Speech processing apparatus for suppressing reverberant tails, said apparatus comprising
an apparatus input port,
an apparatus output port,
a center clipper having an input port, an output port and a clipping level control port,
a center clipper level control circuit having input and output ports connected to said center clipper input and control ports, respectively, to cause the clipping level of said clipper to increase as the envelope of input signals to said input ports of said control circuit and said clipper increases and, furthermore, having an output characteristic which causes any output produced thereby to decrease over a period of time when the input to said control circuit is terminated to cause clipping to suppress said reberberant tails in the output of said clipper,
means connecting said center clipper input port to said apparatus input port,
summing means having a pair of input ports and an output port where said output port is connected to said apparatus output port,
a first filter connected between said center clipper output port and one of said summing means input ports,
a second filter having a passband which is contiguous with but higher than that of said first filter, and
means having a substantially linear transmission characteristic over the passband of said second filter connecting said second filter between said apparatus input port and the remaining input port of said summing means.

8. Apparatus in accordance with claim 7 in which
said means connecting said center clipper input port to said apparatus input port comprises a third filter having a passband substantially identical to that of said first filter.

9. Apparatus in accordance with claims 7 or 8 in which
said control circuit output decreases at a substantially exponential rate upon the termination of an input thereto.

* * * * *